Sept. 16, 1958  F. J. OCNASCHEK  2,852,726
STARTING CIRCUIT FOR SYNCHRONOUS MOTOR
Filed Feb. 21, 1957
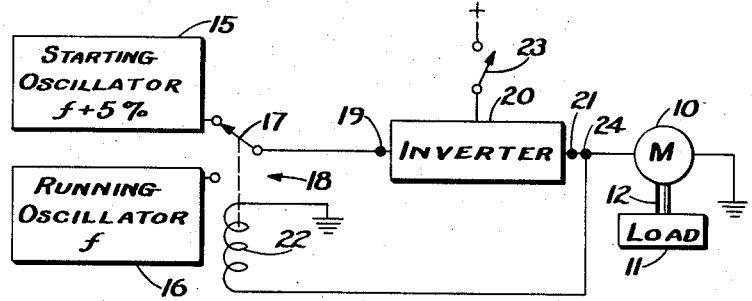
FIG. 1
FIG. 2
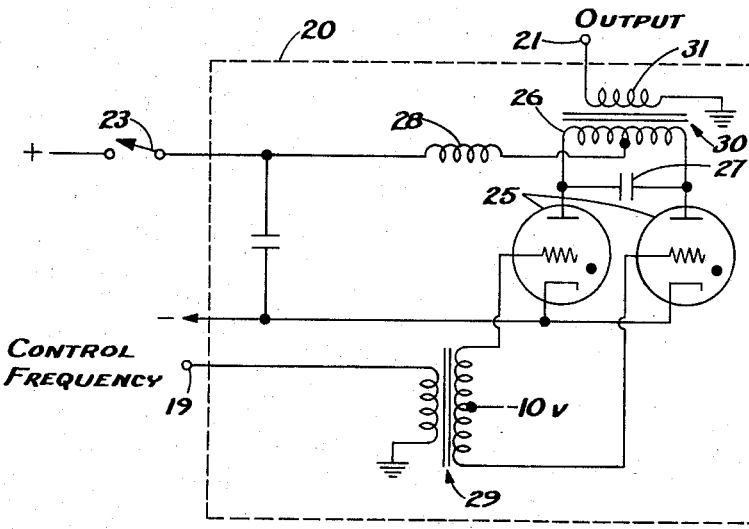
INVENTOR.
FRANK J. OCNASCHEK
BY *Moody & Hakeem*
ATTORNEYS 2,852,726

STARTING CIRCUIT FOR SYNCHRONOUS MOTOR

Frank J. Ocmaschek, Richardson, Tex., assignor to Collins Radio Company, Cedar Rapids, Iowa, a corporation of Iowa Application February 21, 1957, Serial No. 641,602

2 Claims. (Cl. 318—171)

This invention relates to the use of synchronous motors and more particularly to starting circuits therefor.

With prior art systems, in running synchronous motors from inverter power supplies, and especially from power supplies having very little extra power margin, the motor could not be brought into synchronous operation due to its peak power requirements. Prior methods of coping with this problem have been to design the inverter supply with much additional capacity in order to provide close regulation and sufficient peak power. Further difficulties arise from types of synchronous motors having starting windings which are disconnected as the motor approaches synchronism. This change of load causes erratic operation extending as far as to undamped oscillation due to the power regulation and commutating problems of the inverter system.

Accordingly, it is an object of this invention to provide an inverter power supply for a synchronous motor which will start and run the motor, yet which has no more capacity than that needed to hold the motor at its synchronous speed and load.

It is a further object of this invention to provide for a synchronous motor a power supply system which requires a minimum of elements, weight, and cost.

It is a feature of the invention that a minimum number of components is needed to achieve the satisfactory performance of a synchronous motor.

Further objects, features, and advantages of the invention will become apparent from the following description and claims when read in conjunction with the drawing in which:

Figure 1 shows a block diagram of the starting system, and

Figure 2 shows the inverter of Figure 1.

In Figure 1 a synchronous motor 10 is excited by the system. A mechanical load 11 is coupled to the shaft 12 of motor 10. This load is related to the synchronous power capabilities of the motor and has no greater starting demand than the starting characteristics of the motor. When running at a speed synchronous with the supply frequency, motor 10 has an established, or rated, terminal voltage and current.

The frequency source for the system is shown for graphic presentation as two blocks, a starting oscillator 15 and a running oscillator 16. One of the outputs of the two oscillators is selected by the armature contact 17 of the relay 18. The selected frequency is applied to the input 19 of inverter 20. The output terminal 21 of inverter 20 is connected to the ungrounded terminal 24 of motor 10. The other terminal of motor 10 is grounded, completing the supply circuit thereto. Also connected to the ungrounded terminal 24 of motor 10 is the winding 22 of relay 18.

It is readily obvious that the starting and running functions of oscillators 15 and 16 may be derived from a single oscillator. In applied forms of the invention this is usually so, the single oscillator having a frequency control element such as a capacitor or inductor selectively introduced to reduce the frequency of the starting oscillator to that of the running oscillator. In the example of Figure 1 of the invention the starting oscillator is approximately five percent higher in frequency than the running oscillator as a function of the starting characteristics of the motor.

Relay 18 is a voltage sensitive relay. This is to say that coil 22 is so proportioned that the terminal voltage of motor 10 must reach a certain value before armature 17 is moved to the running oscillator position.

To provide off-on control of motor 10, a power switch 23 is in the direct current power line to the inverter. Other locations may be used for the switch so as to energize the oscillator means and inverter at the same time.

Figure 2 shows inverter 20 in detail. Here, elements which are the same as in Figure 1 are numbered similarly. Inverter 20 has a pair of thyratrons 25 in a conventional inverter circuit. The thyratron anodes are connected to opposite ends of a center tapped primary winding 26 with a commutating condenser 27 from anode to anode. An inductance 28 is inserted in the supply lead to the center tap of winding 26 to assist in commutation. The grids of the thyratron tubes are driven push-pull from a center tapped transformer 29, the primary being excited by the control frequency connected to terminal 19. Transformer 29 introduces the control frequency into the grid circuits of thyratrons so as to control the inverter's frequency of operation. Thus, the alternate plate current pulses of tubes 25 in primary 26 induce an alternating voltage in secondary winding 31 of the output transformer 30. This output voltage appears at terminal 21 which is connected to the motor.

In discussing the operation of the circuit, the characteristics of the synchronous motor should be analyzed. In a power supply system having infinite power capabilities relative to the demands of the motor, the terminal voltage of the motor does not vary and consequently the motor starts, accelerates, and pulls into synchronism. A marginal power supply system, however, is one just capable of applying rated voltage and current to the terminals of a synchronous motor as it runs synchronously. There is, however, additional power required to accelerate the motor and to put it into synchronous operation. While the regulation or output voltage variation of the inverter does no harm while the motor starts and accelerates, the regulation results in failure of the supply to meet the demands of the motor at the instant of pulling its speed into synchronism with the frequency of the inverter. Prior to this invention, the marginal power supply, capable of running the motor at synchronous speeds, could only bring the average synchronous motor to a speed three to five per cent below a speed synchronous with the frequency of the supply. This subsynchronous speed is one of the starting characteristics of the motor, and varies somewhat among the various types.

In the operation of the invention in Figure 1, starting oscillator 15 has a frequency approximately five per cent above the frequency ($f$) related to the desired synchronous speed of the motor. This provides a starting frequency of ($f+5\%$). Armature 17 of relay 18 connects this frequency to the control frequency terminal 19 of inverter 20. Switch 23 is closed to energize the inverter. Upon energization inverter 20 produces at its output terminal 21 an alternating voltage having the frequency of the starting oscillator 15. This voltage is applied to the motor 10.

Due to inherent regulation and commutation characteristics of the inverter, the terminal voltage of motor 10 at rest is fairly low. As motor 10 starts and accelerates, the terminal voltage rises. As motor 10 attempts to reach synchronous speed, however, the terminal voltage begins to fluctuate, oscillating under certain conditions about the steady state synchronous, or rated voltage. At this point, the margin of the voltage sensing relay 18 is exceeded whereby armature 17 is pulled in to switch in running oscillator 16. This applies a control frequency of (f) to the inverter, producing a motor driving voltage at frequency (f). Since at the time the terminal voltage rose to nearly that of the rated synchronous voltage, and motor 10 had accelerated to almost the desired speed, the lower frequency of the running oscillator establishes a synchronous speed which is substantially that of, or slightly less than, the speed at which the motor is actually running. As a consequence of the new frequency driving voltage being applied to the motor, the motor responds by pulling in step therewith and running synchronously with frequency (f). The output voltage of the inverter is then at rated synchronous voltage and remains steady.

The characteristic of relay 18 is such that it will pull in, and move its armature, at a value slightly above the rated synchronous voltage but will hold in at the value of the rated synchronous voltage. In applications using a single oscillator, the switch of armature 17 is used to increase one of the reactive elements in the oscillator to decrease the frequency the desired percentage, with an unbroken connection being made to the control frequency terminal 19. The percentage difference between the starting oscillator and the running oscillator is adjusted to be slightly more than needed relative to the motor in use, since some motors may not be stable in this characteristic to achieve repeatedly the critical starting speed, e. g. just exactly five percent below the starting oscillator frequency. Then too, supply, tube and other possible variations are compensated for to produce a reliable circuit.

The operation of Figure 2, as an inverter, is well known in the art and, therefore, need not be discussed.

Although this invention has been described with respect to particular embodiments thereof, it is not to be so limited because changes and modifications may be made therein which are within the full intended scope of the invention as defined by the appended claims.

I claim:

1. A synchronous motor starting system comprising a synchronous motor, an inverter circuit supplying sufficient power to said synchronous motor for operation at synchronous speed, oscillator means, said inverter being excited by said oscillator means, relay means, said relay means being energized by a predetermined level of the terminal voltage of said synchronous motor, said relay means shifting said oscillator means frequency to a lower frequency by a predetermined amount.

2. A synchronous motor start and run system comprising an oscillator means, said oscillator means providing a running frequency and a starting frequency a predetermined percentage higher than said running frequency, inverter means controlled by the frequency of said oscilator means, a synchronous motor, said inverter having sufficient power capability to drive said synchronous motor at rated voltage and current while in synchronism with said running oscillator frequency, voltage sensing means, said voltage sensing means being connected to the terminal of said synchronous motor and to said oscillator means, whereby at a predetermined terminal voltage said voltage sensing means changes said oscillator means output from said starting frequency to said running frequency.

References Cited in the file of this patent

UNITED STATES PATENTS 1,891,084    Fitz Gerald _____ Dec. 13, 1932